(12) United States Patent
Jones

(10) Patent No.: US 11,777,117 B2
(45) Date of Patent: Oct. 3, 2023

(54) FLUID CONNECTOR SYSTEM

(71) Applicant: Intelligent Energy Limited, Loughborough (GB)

(72) Inventor: Iain Jones, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 510 days.

(21) Appl. No.: 17/006,606

(22) Filed: Aug. 28, 2020

(65) Prior Publication Data

US 2020/0395625 A1   Dec. 17, 2020

Related U.S. Application Data

(63) Continuation of application No. 16/070,971, filed as application No. PCT/GB2017/050122 on Jan. 19, 2017, now abandoned.

(30) Foreign Application Priority Data

Jan. 20, 2016  (GB) .................................... 1601052

(51) Int. Cl.
- *H01M 8/04082* (2016.01)
- *F16L 37/04* (2006.01)
- *F16L 21/03* (2006.01)

(52) U.S. Cl.
CPC ......... *H01M 8/04208* (2013.01); *F16L 37/04* (2013.01); *H01M 8/04201* (2013.01); *F16L 21/03* (2013.01)

(58) Field of Classification Search
CPC ........... H01M 8/04208; H01M 8/04201; F16L 37/04; F16L 21/03; F16L 21/02; F16L 21/035; F16L 21/05; Y02E 60/50
See application file for complete search history.

(56) References Cited

U.S. PATENT DOCUMENTS

| | | | |
|---|---|---|---|
| 2,829,909 | A | 4/1958 | Alessandro |
| 3,637,239 | A | 1/1972 | Daniel |

(Continued)

FOREIGN PATENT DOCUMENTS

| | | |
|---|---|---|
| CN | 201351775 Y | 11/2009 |
| DE | 3405229 A1 | 9/1985 |

(Continued)

OTHER PUBLICATIONS

International Patent Application No. PCT/GB2017/050122; Int'l Written Opinion and the Search Report; dated May 8, 2017; 11 pages.

(Continued)

*Primary Examiner* — Muhammad S Siddiquee
(74) *Attorney, Agent, or Firm* — BAKER HOSTETLER LLP

(57) ABSTRACT

A connector system (1) for coupling one fluid conduit to another fluid conduit comprises a first connector element (2) having a mating surface extending around an insertion axis of the connector element. The mating surface incorporates first and second resilient peripheral seals (7, 9) extending around the mating surface, the first and second peripheral seals (7, 9) having different diameters and being separated along the insertion axis. The first connector element (2) bearing the peripheral seals (7, 9) can be the female connector (2), such as shown, or can be the male connector (3).

10 Claims, 2 Drawing Sheets

(56) References Cited

U.S. PATENT DOCUMENTS

| | | |
|---|---|---|
| 3,990,730 A | 11/1976 | Ekman |
| 4,294,473 A | 10/1981 | Ekman |
| 4,475,748 A | 10/1984 | Ekman |
| 4,694,859 A | 9/1987 | Smith, III |
| 4,709,726 A | 12/1987 | Fitzgibbons |
| 4,834,139 A | 5/1989 | Fitzgibbons |
| 5,127,682 A | 7/1992 | Washizu |
| 5,609,370 A | 3/1997 | Szabo et al. |
| 5,709,415 A | 1/1998 | Witter |
| 5,845,945 A | 12/1998 | Carstensen |
| 6,213,206 B1 | 4/2001 | Bakke |
| 6,733,047 B1 | 5/2004 | Stieler |
| 7,837,646 B2 | 11/2010 | Eidinger et al. |
| 2004/0086755 A1* | 5/2004 | Kalal .................. H01M 16/006 429/495 |
| 2010/0269956 A1 | 10/2010 | Iida et al. |
| 2013/0112283 A1 | 5/2013 | Zakuskin |
| 2014/0374417 A1* | 12/2014 | Ozaki .................... B60L 50/72 220/86.1 |
| 2016/0003386 A1 | 1/2016 | Bechis |
| 2019/0011068 A1 | 1/2019 | Maiville et al. |
| 2019/0027765 A1 | 1/2019 | Jones |

FOREIGN PATENT DOCUMENTS

| | | |
|---|---|---|
| GB | 2342133 A | 4/2000 |
| JP | H04-056295 U | 5/1992 |
| JP | 2001-108175 A | 4/2001 |
| JP | 2004-116650 A | 4/2004 |
| JP | 2008-164039 A | 7/2008 |
| JP | 2010-261526 A | 11/2010 |
| KR | 101143552 B1 | 5/2012 |
| WO | WO 2013/115120 A1 | 8/2013 |
| WO | WO 2017/125738 A1 | 7/2017 |

OTHER PUBLICATIONS

International Patent Application No. PCT/GB2017/050122; Int'l Preliminary Reporton Patentability; dated Aug. 2, 2018; 9 pages.

* cited by examiner

FLUID CONNECTOR SYSTEM

CROSS-REFERENCE TO RELATED APPLICATIONS

This application is a Continuation of U.S. patent application Ser. No. 16/070,971 filed on Jul. 18, 2018, which is a 371 National Stage of International Patent Application No. PCT/GB2017/050122, filed Jan. 19, 2017, which claims priority from Great Britain Patent Application No. 1601052.2, filed Jan. 20, 2016, the disclosures of each of which are incorporated herein by reference in their entireties for any and all purposes.

TECHNICAL FIELD

The present invention relates to connector systems for coupling one fluid conduit to another conduit in a fluid-tight manner.

BACKGROUND

There are many systems where it is necessary to couple one fluid conduit to another fluid conduit. One typical example is where a flexible fluid pipe from a fluid source such as a fuel storage vessel needs to be connected to a fluid-consuming unit to transfer fluid fuel to the consuming unit.

There is increasing interest in the use of electrochemical fuel cells as an alternative source of electrical power. Many such fuel cells require hydrogen as a fluid fuel source in order to generate electrical power. Hydrogen fuel sources are often separate from a fuel cell assembly in which the fuel cell is installed, and a hydrogen fuel source must be connected to the assembly in order to supply the hydrogen to the fuel cell assembly.

Many connector systems comprise a female part and a male part which are brought into mating connection and an O-ring seal on one of the parts seals against a corresponding surface of the other part to provide a fluid-tight connection.

A particular problem arises with use of such connector systems for hydrogen transport. Hydrogen gas comprises extremely small molecules which very readily leak past any small defect in an O-ring seal where it meets the mating surface. Maintaining an O-ring sealing surface in good condition is most important for keeping such hydrogen connector systems leak-tight. In connector systems where the connector parts are repeatedly connected and disconnected, there is a repeated risk of damage occurring to the O-ring seal each time the male connector part is slid into the female connector part. The very action of insertion and removal of the male connector part may cause scratches or other damage to the O-ring along the axis of insertion and removal. This, in itself, can result in any scratch traversing the full width, or substantial part thereof, of the O-ring sealing surface with the result that hydrogen is able to leak past the O-ring seal.

SUMMARY

It is an object of the invention to provide an improved connector system less susceptible to damage caused by connection and/or disconnection.

According to one aspect, the invention provides a connector system for coupling one fluid conduit to another fluid conduit comprising: a first connector element having a mating surface extending around an insertion axis of the connector element, the mating surface incorporating first and second resilient peripheral seals extending around the mating surface, the first and second peripheral seals having different diameters and being separated along the insertion axis.

The first connector element may be a female connector component and the mating surface may comprise an internal bore of the female connector component. The mating surface may comprise a first cylindrical portion having a first diameter and a second cylindrical portion having a second diameter different from the first diameter. The first peripheral seal may lie on the first cylindrical portion and the second peripheral seal may lie on the second cylindrical portion. The first and second peripheral seals may each lie partially within a recess in the mating surface to maintain an axial position of the seal. The connector system may further include a second connector element comprising a male connector component having a mating surface comprising an external surface of the male connector component. The male connector component mating surface may comprise first and second cylindrical portions respectively configured to engage with the first and second peripheral seals of the female connector component. The mating surface of the male connector component may comprise a transition portion disposed between the second and first cylindrical portions. The transition portion may comprise a smooth rounded tapered surface of reducing diameter. The first cylindrical portion of the male connector component may be shorter along the insertion axis than the second cylindrical portion of the male connector component, such that the first cylindrical portion of the male connector component cannot be received into the first cylindrical portion of the female connector component until at least some of the second cylindrical portion of the male connector component has been received into the second cylindrical portion of the female connector component. The first and second resilient peripheral seals may each comprise an O-ring seal. The connector system may further include a latching mechanism for providing releasable locking engagement between first and second connector elements.

The first connector element may be a male connector component and the mating surface may comprise an external surface of the male connector component.

The mating surface may comprise a tapered mating surface. The first cylindrical portion may have a diameter which is less than 75% of the diameter of the second cylindrical portion. The first cylindrical portion may have a diameter which is about half the diameter of the second cylindrical portion or less. The male connector component may comprise a distal end having a smooth rounded tapered surface of reducing diameter. The first connector element may be a male connector component and the mating surface may comprise an external bore of the male connector component.

According to another aspect, the present invention provides a connector system for coupling one fluid conduit to another fluid conduit comprising: a male connector element having a mating surface extending around an insertion axis of the male connector element, the mating surface comprising a first cylindrical portion having a first diameter and a second cylindrical portion having a second diameter different from the first diameter, and the first cylindrical portion having a resilient peripheral seal extending around the mating surface, a female connector element having a mating surface extending around an insertion axis of the female connector element, the mating surface comprising a first cylindrical portion having said first diameter and a second cylindrical portion having said second diameter, and the second cylindrical portion having a resilient peripheral seal extending around the mating surface.

BRIEF DESCRIPTION OF THE DRAWINGS

Embodiments of the present invention will now be described by way of example and with reference to the accompanying drawings in which.

DETAILED DESCRIPTION OF THE DRAWINGS

Figure 1:
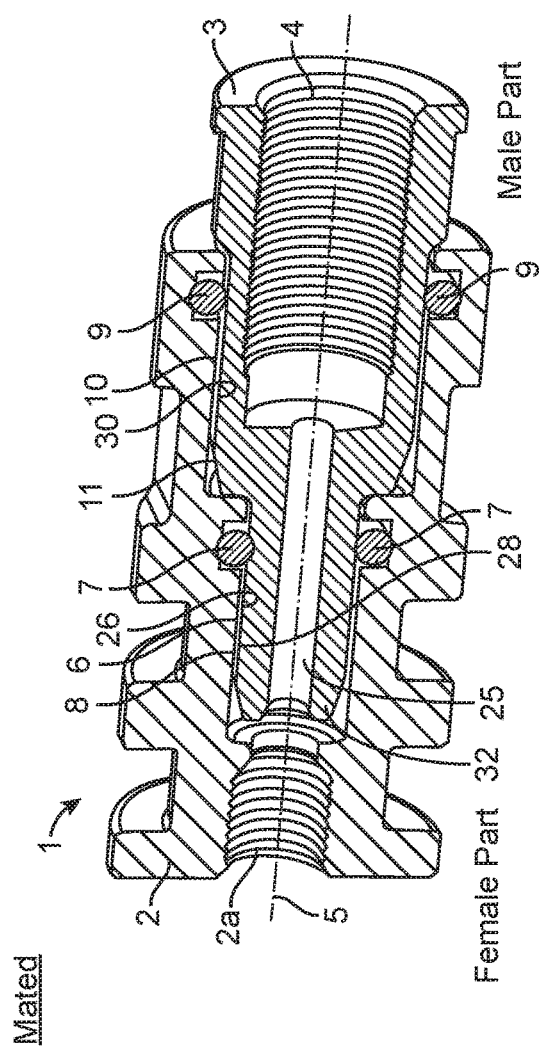
FIG. 1 is a perspective cross-sectional view of a connector system comprising a male connector component and a female connector component in mating engagement.

FIG. 1 shows a connector system 1 for coupling one fluid conduit to another fluid conduit, comprising a female connector component 2 and a male connector component 3. The female connector component 2 includes a fluid conduit 2a and the male connector component includes a fluid conduit 4. Each of these fluid conduits may be coupled to a fluid conduit of another assembly such as a flexible fluid pipe or fluid piping internal to some assembly in which the male and/or female connector component may reside. The male and female connector components 2, 3 both define an insertion axis 5 which is aligned with the direction of insertion and withdrawal of the male component 3 into/from the female component 2.

The female connector component 2 comprises a mating surface 6 which is an internal bore of the component 2. The mating surface 6 includes a first cylindrical portion 8 and a second cylindrical portion 10 having different diameters. The first cylindrical portion 8 incorporates a first resilient seal 7 which extends around the periphery of the mating surface 6, and the second cylindrical portion 10 incorporates a second resilient seal 9 which extends around the periphery of the mating surface 6. The first and second peripheral seals 7, 9 have different diameters (i.e. different circumferences) so as to accommodate the difference in diameters of the first and second cylindrical portions 8, 10. The resilient seals may be O-ring seals. The first and/or second peripheral seals 7, 9 may lie partly within recesses within the mating surface 6 as shown so as to prevent movement of the seals in the direction of the insertion axis 5. The seals 7, 9 may have any suitable cross-section for being retained on the mating surface 6. A suitable cross-section could be circular or of a 'D'-profile or square profile for example. A portion of the or each resilient seal 7, 9 preferably lies slightly proud of the mating surface 6 to provide a compression portion which can be compressed against the male connector component 3.

The mating surface 6 of the female connector component 2 includes a tapered and/or stepped profile 11 providing a transition portion between the first and second cylindrical portions 8, 10. Preferably, this transition portion includes no sharp edges by the use of smooth rounded tapering surfaces where the diameter reduces.

The male connector component 3 comprises a mating surface 26 which is an external surface of the male connector component 3. The mating surface 26 includes a first cylindrical portion 28 and a second cylindrical portion 30 having different diameters. The first cylindrical portion 28 is configured to fit within the first cylindrical portion 8 of the female connector component 2 and to engage I compress the first resilient seal 7 therein. The second cylindrical portion 30 is configured to fit within the second cylindrical portion 10 of the female connector component 2 and to engage I compress the second resilient seal 9 therein.

The mating surface 26 of the male connector component 3 includes a tapered and/or stepped profile 31 providing a transition portion between the first and second cylindrical portions 28, 30. Preferably, this transition portion includes no sharp edges by the use of smooth rounded tapering surfaces where the diameter reduces.

The male connector component 3 includes a bore 25 extending through the component to provide a fluid conduit through to the fluid conduit 2a of the female connector component 2.

A latching mechanism (not shown) may be provided for releasable locking engagement between the female and male connector components 2, 3. A large number of suitable types of latching mechanisms can be envisaged, such as threaded collars, bayonet-type mechanisms, spring-loaded push-fit latches which may have spring release collars, or a simple friction-fit mechanism.

In use, the male connector component 3 is inserted into the female connector component 2 along the insertion axis 5. As the leading or distal end 32 of the male connector component 3 passes into the second cylindrical portion 10 of the female connector component 2, the substantial difference in diameter of the two parts means that there is a low risk of the leading end 32 of the male connector component 3 scraping against the second peripheral seal 9. Upon further insertion of the male connector component, the stepped profile will ensure proper alignment of the axes of the two components 2, 3 such that by the time the leading end 32 of the male connector component 3 reaches the first peripheral seal 7, good alignment of the axes is assured and the first cylindrical portion 28 of the mating surface 26 is unlikely or unable to strike the first peripheral seal 7 other than in smooth sliding engagement. Risk of damage to the first peripheral seal is therefore unlikely or impossible.

A benefit of the dual diameter, dual seal arrangement is that any scraping action in an axial direction by an item inserted into the internal bore of the female connector component is unlikely or unable to cause a line of damage on both seals that extends along the insertion axis and thereby causing a pathway for leakage of fluid such as hydrogen along the axial direction and across both seals 7 and 9. Thus, even where damage to one seal occurs, there should be no systematic corresponding damage to the other seal caused by the same damage event. In other words, the dual seal arrangement is more secure against common-mode failure.

Figure 2:
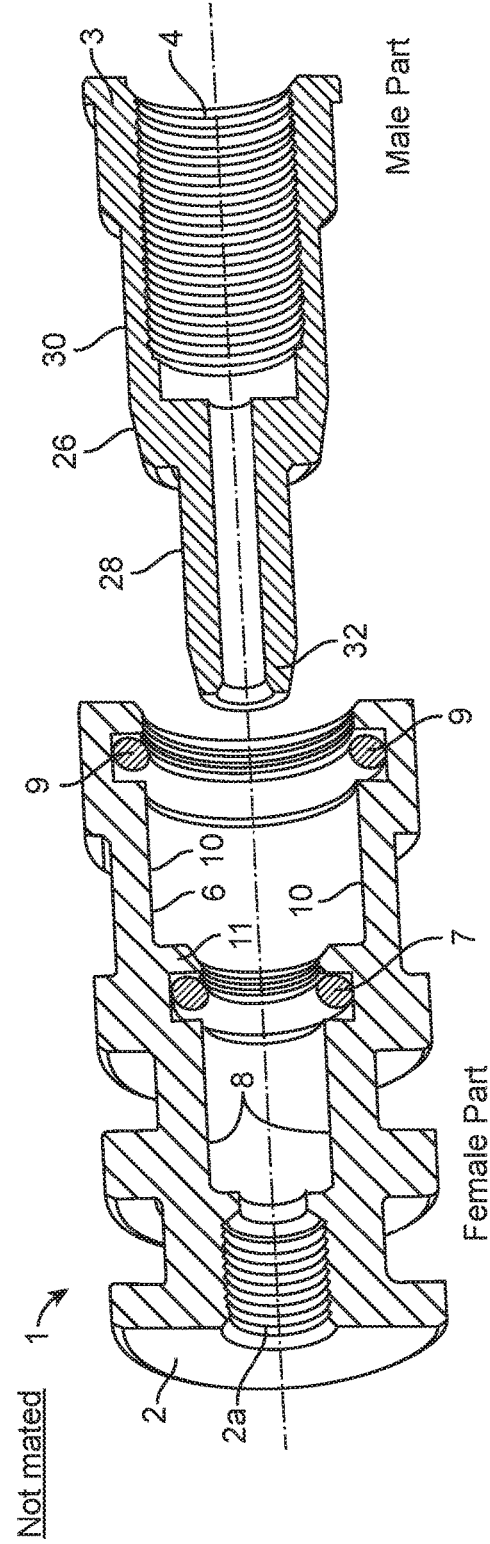
FIG. 2 is a perspective cross-sectional view of the connector system of FIG. 1 with the male and female connector components separated.

A risk to existing connector systems can arise from damage caused to an external sealing surface of the male connector element, e.g. where the mating surface becomes scratched or dented, e.g. by incautious handling when it is not engaged with the female connector element. Then, burrs or roughened portions of the damaged mating surface may cause scratches or striations in O-ring seals when the male connector element is inserted into the female connector element by passing over the O-ring seal. The arrangements as described above, e.g. as shown in FIGS. 1 and 2, reduce this risk in at least two ways. Firstly, as discussed in the preceding paragraph, because the seals 7 and 9 have different diameters, it is not generally possible for a burr or damaged portion of the mating surface 26 to pass both seals 7 and 9 in sliding contact, since the seals have different diameters. Secondly, there is less likelihood that the mating surface 26 of a male connector component with a transition portion 31 between first and second cylindrical portions 28, 30 being damaged on both portions by the same damage event.

Risk of damage to the first seal 7 can also be minimized by ensuring that the difference in diameter of the first cylindrical portion 28 and the second cylindrical portion 30 is large. In one preferred arrangement, the first cylindrical portion 28 has a diameter which is less than 75% of the diameter of the second cylindrical portion 30, and in a further preferred embodiment as illustrated in FIG. 1, the first cylindrical portion has a diameter which is about half the diameter of the second cylindrical portion, or less than half. Thereby, even with quite oblique initial entry of the male connector component 3 into the female connector component 2, likelihood of damaging contact between the leading end 32 and the second seal 9 is low.

A further feature for reducing the risk of damage to the first seal 7 is by making the first cylindrical portion 28 of the male connector component 3 shorter along the insertion axis 5 than the second cylindrical portion 30. This ensures that the second cylindrical portion 30 forces good alignment of the male connector component 3 with the female connector component in advance of the first cylindrical portion 28 of the male connector component 3 entering the first cylindrical portion 8 of the female connector component 2.

Various alternatives to the arrangements described above can be envisaged. A stepped profile of mating surface having a transition portion 11, 31 between first and second cylindrical portions could be replaced with a conical or more uniformly tapering mating surface along its entire axial length such that the two seals 7, 9 have the required difference in diameter.

More than two seals 7, 9 may be used at different axial positions along the mating surface 6 thereby further reducing the risk of leakage by accidental damage to seals.

The cylindrical portions may comprise profiles which are not strictly circular in cross-section, e.g. they could be many sided or circular with a non-circular portion if a 'keyed' profile is required to force a particular orientation (around the insertion axis 5) of mating of the components. However, cylindrical portions of circular cross-section through the insertion axis may be optimal for general purpose.

The circumferential seals 7, 9 could instead or in addition be placed on the mating surface 26 of the male connector component 3, though this may expose the seals to more likely damage at times when the connector components are disconnected from one another. Therefore, internal seals on the female connector component 2 are preferred.

The seals 7, 9 are preferably, as shown, concentric about the insertion axis. The seals 7, 9 are preferably orthogonal to the insertion axis.

The connector components may be of any required size appropriate to the fluid flow application. The connector system may be particularly useful where it is used in a 'blind' mating application, e.g. in a place relatively difficult for access so that a user cannot see well to align the male connector component.

In an alternative arrangement, a first seal could be placed on the male connector component and a second seal could be placed on the female component. In this respect, the dual concentric seal arrangement with the seals having different diameters can be maintained. The connector system thereby has a male connector element with a mating surface extending around the insertion axis where the mating surface has a first cylindrical portion having a first diameter and a second cylindrical portion having a second diameter different from the first diameter, and the first cylindrical portion has a resilient peripheral seal extending around the mating surface. The connector system also has a female connector element with a mating surface extending around an insertion axis of the female connector element, where the mating surface has a first cylindrical portion having a diameter corresponding to said first diameter and a second cylindrical portion corresponding to the second diameter, and the second cylindrical portion has a resilient peripheral seal extending around the mating surface. The first and second diameter portions can be either way round, e.g. the larger diameter seal can be on the male or female connector element.

Figure 3:
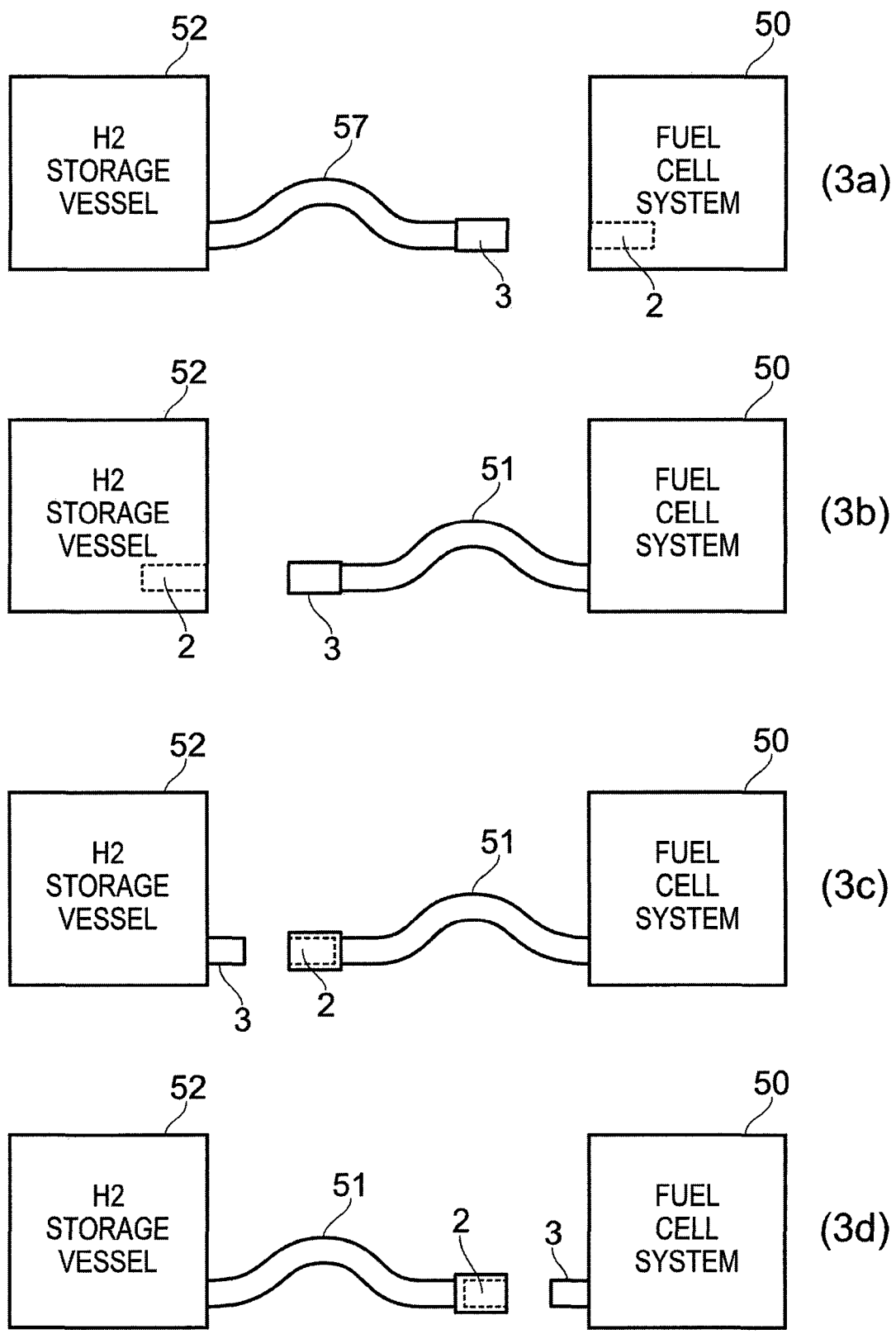
FIG. 3 is a schematic view of the connector system of FIGS. 1 and 2 applied to a fuel cell system for delivery of hydrogen fuel.

The connector system is particularly suited for use with electrochemical fuel cell systems, e.g. for delivery of hydrogen fuel to a fuel cell system for the generation of electrical power. For example, with reference to FIG. 3, the female connector component 2 may comprise a connector element built into the housing of a fuel cell system 50 and the male connector component 3 may terminate a flexible pipe 51 coupled to and extending from a hydrogen storage vessel 52 for delivery of hydrogen fuel from the hydrogen storage vessel to the fuel cell system. Alternatively, as seen in FIG. 3b, the female connector component 2 may comprise a connector element built into the housing of a hydrogen storage vessel 52 and the male connector component 3 may terminate a flexible pipe 51 coupled to and extending from a fuel cell system 50 for delivery of hydrogen fuel from the hydrogen storage vessel to the fuel cell system.

It will be understood that these two arrangements could be reversed, i.e. where the male connector component 3 comprises a connector element built into the housing of a hydrogen storage vessel 52 and the female connector component 2 may terminate a flexible pipe 51 coupled to and extending from the fuel cell system 50 (FIG. 3c); or the male connector component 3 may comprise a connector element built into the housing of the fuel cell system 50 and the female connector component 2 may terminate a flexible pipe 51 coupled to and extending from the hydrogen storage vessel 52 (FIG. 3d).

The connector system may be implemented with both male and female connector components 2, 3 respectively built into the housings of the hydrogen storage vessel and fuel cell system (or vice versa) such that they may plug into one another when the housings of the fuel cell system and the hydrogen storage vessel and are directly connected together, e.g. omitting the flexible pipe 51.

The connector system may be implemented with both male or female connector components 2, 3 built into the housings of the hydrogen storage vessel and the fuel cell system, and a free flexible connector pipe terminated at both ends by a respective, complementary male or female connector component.

The above arrangements may therefore be deployed to construct a fuel cell system having a first connector element having a mating surface extending around an insertion axis of the connector element, the mating surface incorporating first and second resilient peripheral seals extending around the mating surface, the first and second peripheral seals having different diameters and being separated along the insertion axis. The above arrangements may also be deployed to construct a hydrogen storage vessel for delivery of hydrogen to an electrochemical fuel cell having a first connector element having a mating surface extending around an insertion axis of the connector element, the mating surface incorporating first and second resilient peripheral seals extending around the mating surface, the first and second peripheral seals having different diameters and being separated along the insertion axis.

Other embodiments are intentionally within the scope of the accompanying claims.

What is claimed is:

1. A connector system (1) for coupling one fluid conduit to another fluid conduit comprising:
   a female connector component (2) having a mating surface (6) comprising an internal bore extending around an insertion axis (5), the mating surface comprising a first cylindrical portion (8) having a first diameter and a second cylindrical portion (10) having a second diameter different from the first diameter, the mating surface incorporating first and second resilient peripheral seals (7,9) extending around the mating surface, the first and second peripheral seals having different diameters and being separated along the insertion axis with the first peripheral seal (7) lying on the first cylindrical portion (8) and the second peripheral (9) seal lying on the second cylindrical portion (10); and
   a male connector component (3) having a mating surface (26) comprising an external surface comprising first and second cylindrical portions (28,30) respectively configured to engage with the first and second peripheral seals (7,9) of the female connector component (2);
   wherein the first cylindrical portion (28) of the male connector component is shorter along the insertion axis (5) than the second cylindrical portion (30) of the male connector component, such that the first cylindrical portion (28) of the male connector component (3) cannot be received into the first cylindrical portion (8) of the female connector component (2) until at least some of the second cylindrical portion (30) of the male connector component (3) has been received into the second cylindrical portion of the female connector component (2).

2. A fuel cell connector system for coupling one fluid conduit to another fluid conduit comprising:
   a male connector component having a mating surface extending around an insertion axis of the male connector component, the mating surface comprising a first cylindrical portion having a first diameter and a second cylindrical portion having a second diameter different from the first diameter, and the first cylindrical portion having a resilient peripheral seal extending around the mating surface,
   a female connector component having a mating surface extending around an insertion axis of the female connector component, the mating surface comprising a first cylindrical portion having said first diameter and a second cylindrical portion having said second diameter, and the second cylindrical portion having a resilient peripheral seal extending around the mating surface;
   wherein the first cylindrical portion of the male connector component is shorter along the insertion axis than the second cylindrical portion of the male connector component, such that the first cylindrical portion of the male connector component cannot be received into the first cylindrical portion of the female connector component until at least some of the second cylindrical portion of the male connector component has been received into the second cylindrical portion of the female connector component.

3. The connector system (1) of claim 1 in which the first and second peripheral seals (7,9) each lie partially within a recess in the mating surface (6) of the female component (2) to maintain an axial position of the seal.

4. The connector system (1) of claim 1 in which the mating surface (26) of the male connector component (3) comprises a transition portion disposed between the second and first cylindrical portions (28,30), the transition portion comprising a smooth rounded tapered surface of reducing diameter.

5. The connector system (1) of any preceding claim in which the first and second resilient peripheral seals (5,7) each comprise an O-ring seal.

6. The connector system (1) of any preceding claim further including a latching mechanism for providing releasable locking engagement between first and second connector components (2,3).

7. The connector system (1) of claim 1 in which the first cylindrical portion (8) of the female component (2) has a diameter which is less than 75% of the diameter of the second cylindrical portion (10).

8. The connector system (1) of claim 1 in which the first cylindrical portion (8) of the female component (2) has a diameter which is about half the diameter of the second cylindrical portion (10), or less.

9. The connector system (1) of claim 1 in which the male connector component (3) comprises a distal end (32) having a smooth rounded tapered surface of reducing diameter.

10. The fuel cell system (50) of claim 2 in which the female connector component (2) is built into a housing of the fuel cell system (50).

* * * * *